July 16, 1974  S. L. SEYMOUR ET AL  3,824,090

TEMPERING GLASS SHEETS

Filed Feb. 6, 1973  3 Sheets-Sheet 1

United States Patent Office 3,824,090
Patented July 16, 1974

3,824,090
TEMPERING GLASS SHEETS
Samuel L. Seymour, Oakmont, and Joseph A. Noca, Irwin, Pa., assignors to PPG Industries, Inc., Pittsburgh, Pa.
Filed Feb. 6, 1973, Ser. No. 330,145
Int. Cl. C03b 27/00
U.S. Cl. 65—114      13 Claims

ABSTRACT OF THE DISCLOSURE

In tempering heat-softened glass sheets by quenching said glass sheets while supported in an upright position between spaced arrays of tempering nozzles through which tempering medium is applied under pressure to rapidly chill the heat-softened glass sheets, rolling means adapted to make rolling contact with one or both major surfaces is interposed between the inner ends of the nozzles and the glass to limit the degree of buffeting the glass sheet experiences during quenching.

BACKGROUND OF THE INVENTION

1. Field of the Invention

This invention relates to tempering glass sheets, particularly glass sheets supported in an upright (vertical or near vertical) position during chilling a glass sheet heated to a sufficiently high temperature to impart at least a partial temper thereto.

Tempered glass is characterized by a skin that is stressed in compression completely surrounding an interior core that is stressed in tension. In order to produce tempered glass, a glass sheet is first heated to a temperature well above its strain point, and approaching its softening point. Such a temperature is preferably substantially uniform through the glass thickness in any given area although it may vary from area to area when differential tempering is desired. The elevated temperature required for tempering is higher than the temperature needed to deform the glass sheet.

After the glass sheet has obtained a sufficiently high temperature, it is suddenly chilled by quenching. This latter step is usually accomplished by applying cold air jets rapidly against the opposite surfaces of the heat-softened sheet while providing relative movement between the sheet and the jets. The secret of an effective tempering operation is to chill the glass so rapidly that its surface regions are cooled through the annealing range of the glass to its strain point where the surface becomes set while the interior remains above the strain point and is still plastic.

It is well known that the portions of the glass sheet that cool through the annealing range before other portions develop a compression stress whereas the other portions develop a tension stress when the entire glass sheet cools and remains permanently below the strain point. Since glass is notoriously strong when stressed in compression and weak when stressed in tension, the glass skin stressed in compression provides a protective coating that causes the glass to be much more resistant to breakage than untempered glass. Another factor in rendering tempered glass safer than untempered glass is that tempered glass breaks up into very small fragments having smooth surfaces in the less frequent instances when it does fracture. These smoother particles of fractured tempered glass or "dice" are far less harmful to occupants of a vehicle than fractured untempered glass, which fractures more readily than tempered glass and, upon fracturing, produces pieces having jagged edges that are very dangerous.

It is well known that it is necessary to have continuous relative movement between the glass and the nozzles through which air is applied under pressure during the quenching operation and to have each glass sheet increment subjected to the same amount of cooling as each other glass increment in order to minimize iridescent markings on the glass. However, it is also well known that applying air under pressure simultaneously against the opposite surfaces of a glass sheet supported in an upright position tends to cause the glass sheet to sway and flutter, particularly when the glass sheet is suspended vertically from tongs. If such flutter becomes uncontrolled, the glass sheet bumps into the moving nozzles and breakage is likely.

2. Description of the Prior Art

British Pat. No. 505,189 to Pilkington Brothers, Limited, proposes to prevent or limit the swaying of the glass by providing a device adapted to hold the glass substantially stationary during the chilling operation. The heated glass sheet is gripped or kept substantially straight between a pair of grids, each of which carries an array of spaced pads. When the grids are brought together, the opposite arrays of pads either contact or move very closely adjacent to the glass. When the glass sheet is supported by tongs, the pads do not contact the glass but are so close to the glass as to limit undue swaying.

The pads suggested in the British patent are in the form of fingers composed of carbon or wood which carbonize after contact with the glass or asbestos or other heat resitsing material. Such fingers are small in cross section and make contact with the same portion of the glass sheet surface either intermittently or continuously throughout the cooling step of the tempering operation. Therefore, the glass sheet is cooled at a non-uniform rate of cooling over the entire surface area of the sheet, and a non-uniform temper pattern of spots of iridescence is readily visible. In addition, optical defects are likely to be observed at the points of contact between the fingers and the heat-softened glass sheet.

SUMMARY OF THE INVENTION

The present invention limits the degree of buffeting by providing spacers in the form of roller means interposed between the ends of the nozzles and the major glass surface to prevent the glass sheet from buffeting or swaying into contact with one or the other nozzle arrays. Also, roller contact between the roller means and the glass reduces the difference in cooling rates between the glass areas that contact the roller means and the glass area fully exposed to tempering medium throughout the entire cooling operation, because the roller means makes moving contact over an elongated area rather than with fixed areas as is the case with the prior art spacers. Therefore, the present invention makes it difficult for an untrained observer to notice any iridescent pattern of the type easily seen in an article tempered by apparatus having fixed finger-type spacers.

The benefits of the present invention will be understood more clearly from a description of an illustrative preferred embodiment which follows.

BRIEF DESCRIPTION OF THE DRAWINGS

In the drawings which form part of a description of an illustrative preferred embodiment of the present invention and where like reference numbers refer to like structural elements.

DESCRIPTION OF A PREFERRED EMBODIMENT

Figure 3:
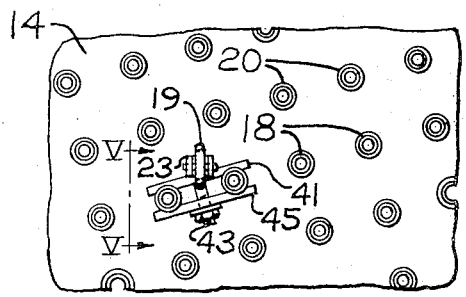
FIG. 3 is a fragmentary elevational view showing how one of the roller means is supported by a pair of adjacent nozzles.
Figure 1:
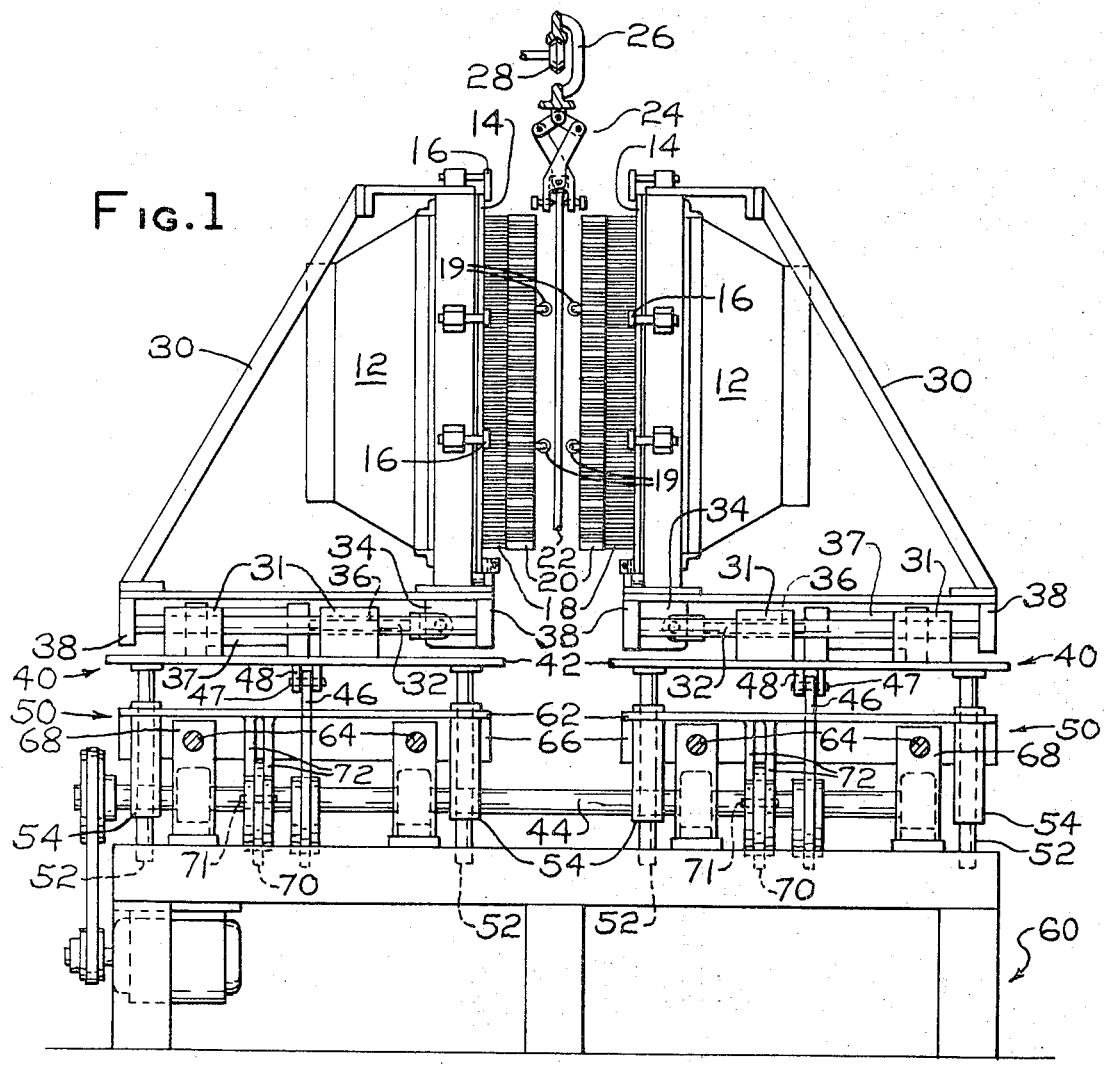
FIG. 1 is an end view partly in section, of an illustrative embodiment of the present invention, with certain parts broken away to show other parts more clearly.
Figure 2:
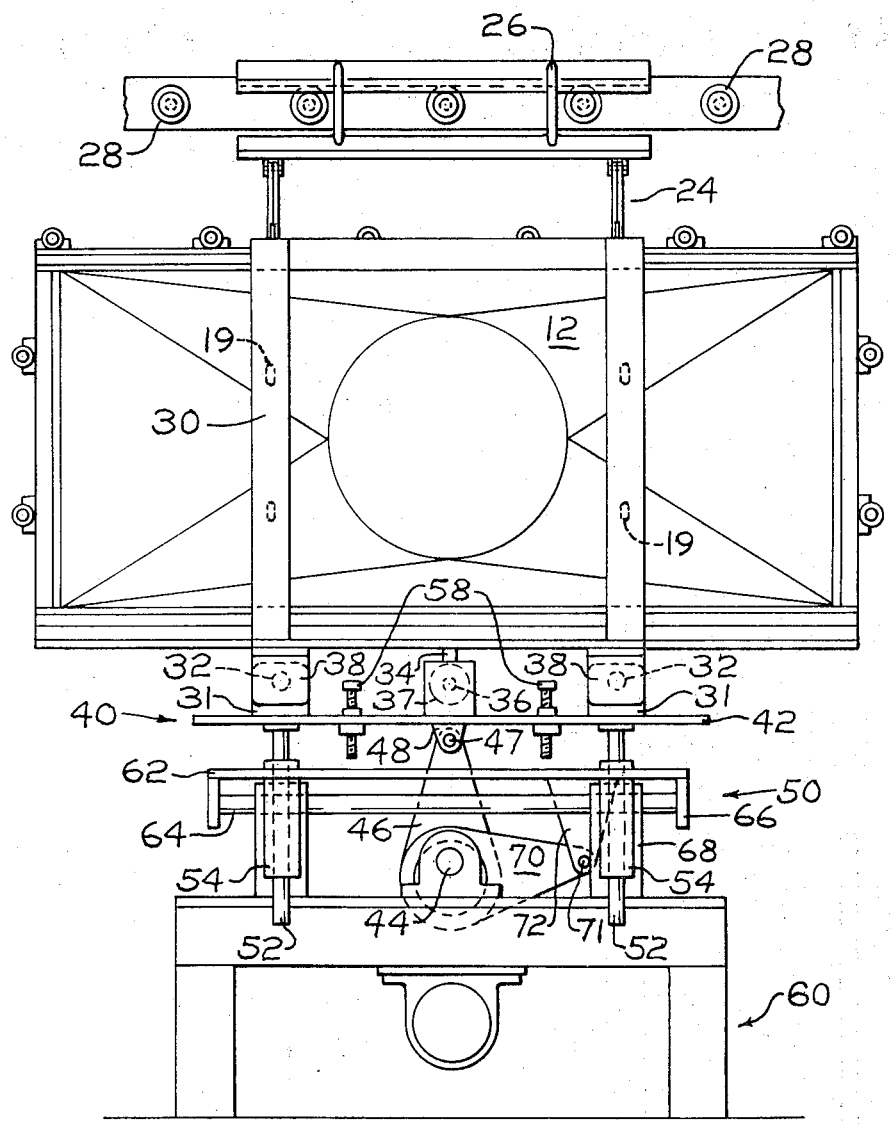
FIG. 2 is a view taken at right angles to the view of FIG. 1.

Referring to the drawings, a tempering apparatus comprises a pair of plenum chambers 12 connected through flexible conduits (not shown) to a conventional blowing means (not shown). An apertured wall 14 is locked to the opposing inner ends of each plenum chamber through peripherally spaced clamping means 16. Each aperture in the apertured wall supports an elongated nozzle 18. Rollers 19 are supported for free rotation by adjacent nozzles 18.

Flexible nozzle extensions 20 are provided where needed to form a pair of spaced discontinuous shaped surfaces conforming to the shape of glass sheets undergoing treatment. To accomplish this, nozzle extensions 20 of different lengths are attached over the free ends of different nozzles 18 to provide spaced arrays of the ends of the flexible nozzle extensions 20 that conforms to any shape desired. The nozzles 18 are preferably of tubular metal and the nozzle extensions 20 of synthetic silicone rubber or spring metal or the like. The free inner ends of the nozzle extensions 20 terminate at equal distances from the positions occupied by the portions of the major surface of a glass sheet that they face.

A glass sheet 22 is shown suspended by one or more pairs of tongs 24 of the self-closing type. A carriage 26 that rides on a series of rotatable rolls 28 of a roller conveyor is used to support the tongs 24. Any conventional type of tong may be used to grip the glass sheets 22 near their upper edge. However, it is preferred to use tongs of the type shown in U.S. Pat. No. 2,991,114 to Lee R. Robinson which are provided with stops that engage the upper edge of the glass so that the glass gripping elements of the tongs engage the major surfaces of the glass at a definite, predetermined distance from the upper edge that is neither too close to the upper edge nor too far from the upper edge.

Each plenum chamber 12 is reinforced by a skeleton structure 30 whose lower portion comprises a pair of horizontally extending slide rods 32 slidably mounted through spaced apertured lugs 31. A additional lug 34 is attached to a horizontal piston shaft 36 capable of horizontal movement in both directions. Each end of each slide rod 32 is fixed to a bracket 38 rigidly attached to the skeleton structure 30. A double acting piston 37 actuates movement of the piston shaft 36 and with it the skeleton structure 30 in a horizontal path guided by the slide rods 32. The lugs 31 and pistons 37 are carried by an upper supporting means 40 so that the slide rods 32 are slidably supported in bearing contact with the spaced lugs 31 when the plenum chambers 12 are moved with piston shafts 36.

The upper supporting means 40 comprises a pair of upper tables 42 mounted in parallel relation to one another, one for supporting one of the plenum chambers 12 and its reinforcing skeleton structure 30 and the other for supporting the other plenum chamber 12 and its respective skeleton supporting structure 30. Each upper table 42 is provided with a plurality of the aforesaid lugs 31 so that when the piston shaft 36 is moved, the position of the respective plenum chamber 12 relative to the upper table 42 is changed in a horizontal direction normal to the path of glass sheet movement defined by the roller conveyor. Thus, the plenum chambers 12 may be separated from one another whenever it is desired to change one array of nozzle extensions 20 for another whenever there is a change in patterns to be produced. In addition, when the plenum chambers 12 are separated, the position of the array of nozzle extension openings on each side of the position the glass sheet 22 occupies in the tempering station may be regulated to insure that the nozzle to glass distance is optimum for the thickness and shape of glass undergoing tempering. The piston rods 36 may be actuated by a series of limit switches engageable by cams carried by the carriage 26 to separate the plenum chambers 12 to permit curved glass sheets to move into a position between the plenum chambers 12 for quenching, to move the plenum chambers to a closed position during quenching and to separate them again after quenching is completed to permit removal of the shaped glass sheet.

As stated previously, it is necessary to impart relative motion between the arrays of nozzles and the glass sheet in order to avoid establishing an iridescence pattern in the glass resulting from non-uniformly chilling the glass. The present invention provides vertical reciprocation for the upper tables 42 and their supported plenum chambers 12 through a main drive shaft 44 provided with eccentric driving links 46. The upper end of each eccentric driving link 46 is connected through a pin 47 to an eccentric clevis 48 fixed to a different table 42. A lower support means 50 guides a plurality of vertical posts 52 depending from each upper table 42 by vertical sleeves 54 attached to means 50. The posts 52 and sleeves 54 thus guide the vertical movement of the tables 42 in vertical reciprocating paths when the upper tables 42 are drivingly connected to the main drive shaft through eccentric driving links 46. Each upper table is provided with a pair of locking bolts 58, the purpose of which will be explained later.

The main drive shaft 44 is also drivingly connected to the lower supporting means 50. The latter comprises a pair of lower tables 62. Each lower table 62 is disposed below an upper table 42 and is provided with spaced elongation horizontal rods 64 that are connected at their longitudinal ends to end walls 66 and intermediate their end walls to apertured supports 68 carried by a main support structure 60. The elongated rods 64 extend horizontally at right angles to the direction of the main drive shaft 44. A pair of eccentric driving links 70 drivingly connects the main drive shaft 44 through two pins 71 to eccentric clevis arrangements 72 similar to the pins 47 and the eccentric clevises 48 that connect the eccentric driving links 46 to the upper tables 42.

The lower tables 62 are smaller than the upper tables 42 and the locking bolts 58 may be adjusted downward until the lower ends of the bolts 58 are in contact with the upper surface of tables 62 to enable the locking bolts 58 to apply the weight of the upper tables 42 on the lower tables 62 whenever it is desired to remove the locking pins 47 from the eccentric clevises 48. With the upper table driving clevises 48 disconnected from the eccentric driving links 46 and with the vertical guide rods 52 extended in the vertical sleeves 54 carried by the lower tables 62, the upper tables 42 and the lower tables 62 are reciprocated in unison whenever main drive shaft 44 is rotated. The reciprocation is horizontal.

When the driving pins 71 between the eccentric driving links 70 and the lower table clevises 72 are disconnected and the driving pins connecting the eccentric drive links 46 and the eccentric clevises 48 of the upper tables 42 are connected, the lower tables 62 remain fixed in place relative to the main support structure 60 and the upper tables 42 reciprocate vertically when the main drive shaft 44 is rotated through the eccentric drive link 46, the eccentric clevis 48 and the vertical guide means provided by the sliding engagement of the vertical guide rods 52 through the vertical sleeves 54. When both eccentric driving links 46 and 70 are suitably connected to their respective drive clevises 48 and 72, through pins 47 and 71, a closed circular orbital pattern is provided to each plenum chamber 12 supported on its respective upper supporting means 40 which moves relative to the lower tables 62 in a vertical direction while keyed for horizontal reciprocation with the lower supporting tables 62 in a horizontal direction along the axis defined by the elongated rods 64.

As shown in FIG. 3, the nozzles 18 are arranged in rows extending obliquely to the axes of horizontal or vertical reciprocation. This arrangement enables the nozzles to sweep areas of the glass sheet that overlap the areas swept by blasts from adjacent nozzles regardless of whether the arrays of nozzles are reciprocated linearly in the horizontal direction or in the vertical direction, or whether a closed orbital motion is imparted to the nozzles in vertical planes generally parallel to the vertical plane of support for the glass sheet. It is well known that the displacement of each nozzle must be greater than the distance between adjacent nozzles in order to provide as uniform a cooling pattern as possible.

What has been described is a tempering apparatus of the type disclosed and claimed in U.S. Patent application Ser. No. 299,970 of Antonio Luppino, filed Oct. 24, 1972, modified in accordance with one embodiment of the present invention, namely, roller means 19. The latter comprises four freely rotatable rollers associated with each plenum chamber 12. Each roller is composed of a material that does not mar the surface of a glass sheet heated to an elevated temperature sufficient for tempering. A suitable family of alumino-silica compositions sold by Johns-Manville under the trade name Marinite and consisting essentially of incombustible asbestos fibers, diatomaceous silica and a hydrothermally-produced inorganic binder is available in various densities. Suitable roller means have densities ranging from approximately 36 pounds per cubic foot to aproximately 65 pounds per cubic foot. These are identified as Marinite 36 to Marinite 65, respectively. Rollers are also made by cutting rings from a tube sold by Carborundum Company under the trademark Fiberfrax.

The roller means 19 are so disposed that the peripheral portion thereof closest to the position occupied by the glass sheet 22 is located in a vertical plane spaced inward of the inner end of nozzle extensions 20 and outward of the adjacent major surface of glass sheet 22. Thus, when tempering medium applied through nozzle arrays 18 causes the glass sheet 22 to buffet while it undergoes cooling, the roller means 19 make rolling contact with the glass and prevent the glass from contacting the inner ends of the nozzles 18 or the nozzle extensions 20 if the latter are attached to nozzles 18.

Figure 5:
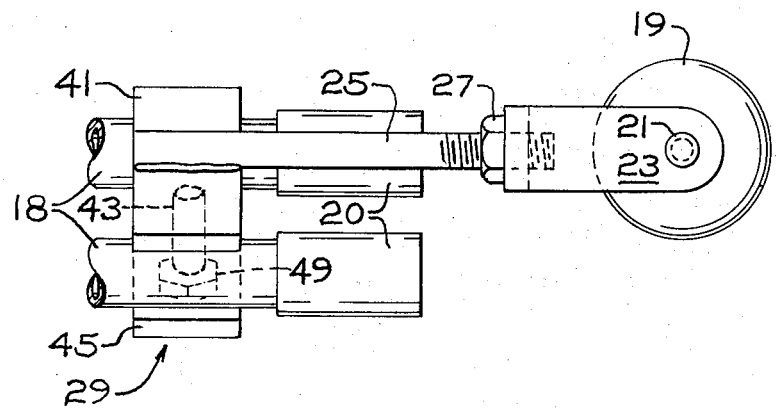
FIG. 5 is an enlarged fragmentary view taken along the lines V—V of FIG. 3 and at right angles to the view of FIG. 4.
Figure 4:
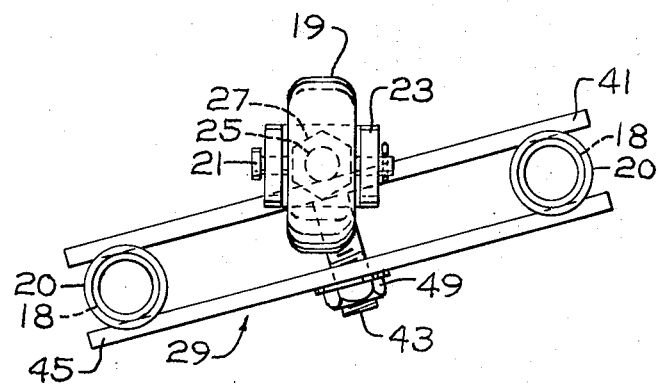
FIG. 4 is a fragmentary, enlarged view of a portion of FIG. 3.

The roller means 19 may be attached to nozzles 18 or to the walls 14 of plenum chambers 12 in any convenient manner. As seen in FIGS. 3 to 5, a typical disc type roller 19 of Marinite 65 approximately 1½ inches in diameter and ½ inch thick with rounded shoulders forming a peripheral tread about ¼ inch wide is mounted for free rotation about a stub shaft 21. Providing the rollers 19 with rounded shoulders has two benefits. First, it reduces the area of rolling contact between the glass and the spacer means and, secondly, it reduces the obstruction to free flow of tempering medium relative to the major glass surfaces. Thus, the cooling rate of the glass portions contacted by the rolling means 19 of the present invention more nearly approximates that of the remainder of the glass that does not contact the rollers compared to the relative rates of cooling of fingercontacted portions of glass sheets with the rest of the glass when spacers of the finger type of the prior art are used.

Cotter pins secure the stub shaft across the walls of a clevis 23. The head of the clevis is threaded to receive an externally threaded rod 25. A jam nut 27 threaded on the rod 25 clamps the clevis 23 in a desired orientation with respect to rod 25. A clamp 29 comprising a first clamping plate 41 attached on one surface thereof to an end of the threaded rod 25, a threaded bolt 43 secured at one end to the other surface of clamping plate 41, a second clamping plate 45 apertured to receive the free end of threaded bolt 43, and a clamping nut 49.

Clamping plate 41 is held against two adjacent nozzles 18 of an array and roller means 19 is oriented to roll in a direction parallel to the axis of reciprocation of the plenum chambers 12 and their associated nozzle arrays. Then jam nut 27 is rotated to lock the clevis 23 in proper orientation to threaded rod 25.

When the tempering apparatus is adjusted to reciprocate the arrays of nozzles 18 vertically, the clevises 23 are adjusted to have stub shafts 21 extend in a horizontal direction so that roller means 19 can rotate freely about horizontal axes. When the apparatus is arranged to reciprocate the arrays of nozzles 18 horizontally, the clevises 23 are adjusted so that stub shafts 21 extend vertically, thus permitting roller means 19 to rotate freely about vertical axes.

While the drawings show roller means 19 disposed on both sides of the glass sheet 22, it is also within the gist of the present invention to provide roller means to one side only of the glass sheet and apply tempering medium at different pressures against the opposite surfaces of the glass sheet G so as to tend to force the sheet to tilt in the direction of the nozzle array to which the roller means is attached.

Even though prior experience had led those skilled in the art to believe that any contact between a moving spacing means and a heated glass sheet that limits the amplitude of the angle of buffeting would cause optical imperfections in the glass surfaces in the area of contact and such is the case when fingers are used as the spacing means, the substitution of free roller means as the means to space the glass sheet from the nozzles, thus limiting the degree of buffeting, has resulted in such little optical distortion as to be invisible to the general public. At the same time, rolling contact has reduced the differential in cooling between the glass area contacted by the spacers and the glass area fully exposed to tempering medium. Thus, tempered glass sheets processed by tempering apparatus provided with roller means to control the degree of buffeting have a more uniform temper than those processed by tempering apparatus provided with spacing fingers of the prior art.

A typical program of operation for the above-identified apparatus is as follows: As a glass sheet reaches the temperature needed for tempering, it is transferred from the furnace (not shown) to a position between the plenum chamber 12. The latter occupy a retracted position to which they moved by outward movement of the piston shafts 36 when the previous glass sheet to be treated left the tempering station. During movement of the next glass sheet 22 from the furnace to the quenching station, the carriage 26 trips a limit switch along the carriage conveyor 28, which actuates a timer that actuates inward displacement of the piston shafts 36 toward one another, which displaces the plenum chambers 12 toward a closed predetermined position. The blowers are actuated to start delivering air blasts against the opposite surfaces of the glass sheet when one of the skeleton supporting structures 30 engages a limit switch whose position for engagement is adjustable depending upon the nature of the shape of the glass sheet being treated. The main drive shaft 44 operates continuously throughout the operation to avoid any inertia problems brought about by the fact that the upper supporting means 40, the lower supporting means 50 and the plenum chambers 12 and the skeleton supporting structure 30 have too great a mass to start and stop movements intermittently. Therefore, as soon as the plenum chambers arrive at the closed position, air is blasted in moving patterns relative to the glass sheet 22 supported therebetween for sufficient time to impart the desired temper in the glass.

A timer actuated by the limit switch that initiates the air blasts times out to shut off the blower that supplies pressurized air to the plenum chambers, causes piston rods 36 to retract and the conveyor 28 to transfer the carriage 26 to a subsequent treating station which may be an unloading station. The cooling or quenching station is now in condition to receive the next glass sheet to be processed.

The only time the drive shaft 44 is stopped is when the apparatus is not used or the apparatus is being prepared for a change of pattern. Then, as a consequence of the pattern change, it may become necessary to attach or remove the pin 47 which engage eccentric driving links 46 to clevises 48 to provide a vertical component of motion of the upper tables 42 and the plenum chambers 12 relative to the lower tables 62 and/or to attach or remove the pins 71 which engage eccentric driving links 70 to clevises 72 to impart a horizontal component of motion to the lower tables 62, the upper tables 42 and the plenum chambers 12. If both sets of eccentric driving links 46 and 70 are engaged, the two components of motion combine to provide closed orbital movement to the plenum chambers 12. Otherwise, with only one set of driving links engaged, the plenum chambers 12 are provided with linear reciprocating movement as described before.

The description of the preferred illustrative embodiment has been for the purpose of illustration rather than limitation. It is understood that various changes may be made such as using freely rotatable castors as the roller means 19 instead of the wheels disclosed, particularly when the nozzle arrays are provided with orbital motion rather than linear reciprocation, or attaching a different number of roller means to each nozzle array from the number shown in the illustrative embodiment, or supporting the glass by a bottom edge combined with mechanical or fluid balancing means, for example. Furthermore, the present invention is intended for use while supporting a glass sheet in an upright position in either a vertical or an oblique plane. Hence, the term "upright position" as recited in the claims means glass sheet support in an oblique plane as well as a vertical plane. The use during quenching of roller type spacing elements that move relative to the contacted glass sheet portions instead of fingers that do not move relative to the major glass surfaces results in a more gradual thermal gradient between the glass sheet portions that contact or face the spacing elements and the remainder of the treated glass sheet regardless of whether one uses the preferred embodiment or a suggested modification of the present invention. The tempered glass articles produced according to the present invention have neither the sharply defined areas of iridescence or the small bumps or recesses that may provide optical imperfections in tempered glass articles produced on apparatus that uses rigid fingers as spacing elements. The modifications suggested herein are considered within the gist of the invention as defined in the claimed subject matter that follows.

What is claimed is:

1. Apparaus for cooling a glass sheet supported in an upright position comprising a first array of nozzles disposed to one side of a vertical plane, a second array of nozzles disposed to the other side of said vertical plane, means for supporting a heated glass sheet in an upright position in said vertical plane in alignment between and in spaced relation to said nozzle arrays, means for imparting tempering medium at a sufficient rate and pressure to said nozzle arrays for discharge against the opposite surfaces of said glass sheet so supported so as to impart at least a partial temper thereto, means for moving said nozzle arrays in unison relative to said upright position, roller means, and means attaching said roller means to at least one of said nozzle arrays in such a manner that the peripheral portion of said roller means closest to said upright position is located in a vertical plane intermediate said attached array of nozzles and said upright position, said roller means being in position to make rolling contact with a major surface of said glass sheet subjected to pressurized tempering medium against both major surfaces thereof from said moving nozzle arrays and to prevent the glass sheet from pivoting into contact with said one of said nozzle arrays.

2. Apparatus as in claim 1, wherein only one of said arrays of nozzles has means attaching said roller means thereto and means is provided for imparting tempering medium at a lesser force through said nozzle array having said roller means attached and for imparting tempering medium at a greater force through said other nozzle array.

3. Apparatus as in claim 1, wherein means are provided to attach roller means to both of said nozzle arrays in positions intermediate said nozzle arrays and said upright position.

4. Apparatus as in claim 1, wherein said means for moving said nozzle arrays in unison is constructed and arranged to reciprocate said arrays in vertical paths, and said roller means is mounted for rotation about a horizontal axis.

5. Apparatus as in claim 1, wherein said means for moving said nozzle arrays in unison is constructed and arranged to reciprocate said arrays in horizontal paths, and said roller means is mounted for rotation about a vertical axis.

6. Apparatus as in claim 1, wherein said glass sheet supporting means comprises tongs which grip said glass sheet near its upper edge.

7. Apparatus as in claim 1, wherein said roller means is free running and composed of a material that does not mar the surface of a glass sheet heated to a temperature sufficient for tempering by rolling contact thereagainst.

8. Apparatus as in claim 1, wherein said roller means comprises a plurality of rollers of generally disc shape configuration having rounded peripheral shoulders connecting relatively narrow tread portions to relatively thick main portions, said rounded shoulders helping to minimize obstruction to free flow of tempering medium relative to said major surface portions contacted by said rollers.

9. A method of tempering a glass sheet comprising supporting a heated glass sheet in an upright position, imparting tempering medium against the opposite surfaces of said sheet from a pair of nozzle arrays having openings facing one or the other major surface of said glass sheet and spaced from said major surfaces, imparting relative motion between said major surfaces and said nozzle arrays while contemporaneously interposing roller means in the space between at least one of said nozzle arrays and the major surface facing said nozzle array, whereby when said tempering medium buffets said glass sheet toward said one of said nozzle arrays it is prevented from hitting said one of said nozzle arrays by rolling contact between said glass sheet and said roller means.

10. In the method as in claim 9, wherein said nozzle arrays are reciprocated in a vertical direction and said roller means reciprocates vertically in unison with said nozzle arrays.

11. In the method as in claim 9, wherein said nozzle arrays are reciprocated in a horizontal direction and said roller means reciprocates horizontally in unison with said nozzle arrays.

12. In the method as in claim 9, wherein said roller means resides between only one of said nozzle arrays and a major surface of said glass sheet and tempering medium is imparted against the major surface of said glass sheet facing said roller means at a lesser force than against the other major surface to tilt said glass sheet toward said roller means and away from the nozzle array not provided with said roller means.

13. In the method as in claim 9, wherein roller means are interposed between each nozzle array and one or the other major glass sheet surface.

References Cited

UNITED STATES PATENTS

| | | | |
|---|---|---|---|
| 1,999,588 | 3/1933 | Fox | 65—349 |
| 2,677,918 | 5/1954 | Bird et al. | 65—348 |

FOREIGN PATENTS

| | | | |
|---|---|---|---|
| 505,189 | 5/1939 | England | 65—114 |

S. LEON BASHORE, Primary Examiner

PETER F. KRATZ, Assistant Examiner

U.S. Cl. X.R.

65—348